(12) United States Patent
Kang et al.

(10) Patent No.: US 12,711,878 B2
(45) Date of Patent: Aug. 18, 2026

(54) TEACHING AID FOR LEARNING MUSCULOSKELETAL STRUCTURE OF HUMAN BODY

(71) Applicants: Hyo Sil Kang, Seoul (KR); Hyo Jeong Kang, Jeollanam-do (KR); Young Hoo Yoon, Seoul (KR)

(72) Inventors: Hyo Sil Kang, Seoul (KR); Hyo Jeong Kang, Jeollanam-do (KR); Young Hoo Yoon, Seoul (KR)

( * ) Notice: Subject to any disclaimer, the term of this patent is extended or adjusted under 35 U.S.C. 154(b) by 236 days.

(21) Appl. No.: 18/574,004

(22) PCT Filed: Jun. 7, 2022

(86) PCT No.: PCT/KR2022/007970
§ 371 (c)(1),
(2) Date: Dec. 22, 2023

(87) PCT Pub. No.: WO2022/270793
PCT Pub. Date: Dec. 29, 2022

(65) Prior Publication Data

US 2025/0078684 A1 Mar. 6, 2025

(30) Foreign Application Priority Data

Jun. 24, 2021 (KR) ........................ 10-2021-0082018

(51) Int. Cl.
*G09B 23/32* (2006.01)

(52) U.S. Cl.
CPC .................................... *G09B 23/32* (2013.01)

(58) Field of Classification Search
CPC ......... G09B 23/30; G09B 23/32; G09B 23/34
See application file for complete search history.

(56) References Cited

U.S. PATENT DOCUMENTS

2009/0081627 A1* 3/2009 Ambrozio .............. G09B 23/34 434/267
2013/0196303 A1* 8/2013 Takasu .................. G09B 23/28 434/274

FOREIGN PATENT DOCUMENTS

JP H10232601 A 9/1998
JP 2006323103 A 11/2006
(Continued)

OTHER PUBLICATIONS

Sciencstar Co., Ltd. “Arm Muscle Model”, Jul. 30, 2013; https://blog.naver/com/sstar5905/10173346267.

*Primary Examiner* — Kang Hu
*Assistant Examiner* — Correll T French
(74) *Attorney, Agent, or Firm* — Fishman Stewart PLLC

(57) ABSTRACT

A teaching aid for learning the musculoskeletal structure of the human body may include a skeletal model and a muscle model. The skeletal model may include a plurality of fixing rings disposed at positions corresponding to an origin point and an insertion point of a muscle. The muscle model may have elasticity in a longitudinal direction and may have two ends connected to the fixing rings at the origin point and the insertion point, respectively. The muscle model may include an elastic band having elasticity, a first fastening ring connected to a first end of the elastic band, and a second fastening ring connected to a second end of the elastic band. The first and second fastening ring may be connected to the fixing rings. A stopper may be arranged on the elastic band to adjust a distance between the first end and the second end of the elastic band.

8 Claims, 6 Drawing Sheets

(56) References Cited

FOREIGN PATENT DOCUMENTS

| | | | |
|---|---|---|---|
| JP | 2012181365 | A | 9/2012 |
| JP | 2016114881 | A | 6/2016 |
| KR | 20190078297 | A | 7/2019 |
| KR | 102287632 | B1 | 8/2021 |

* cited by examiner

FIG. 2
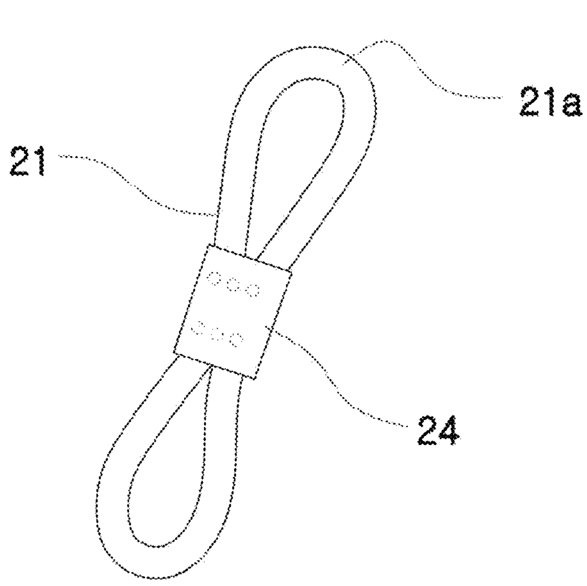
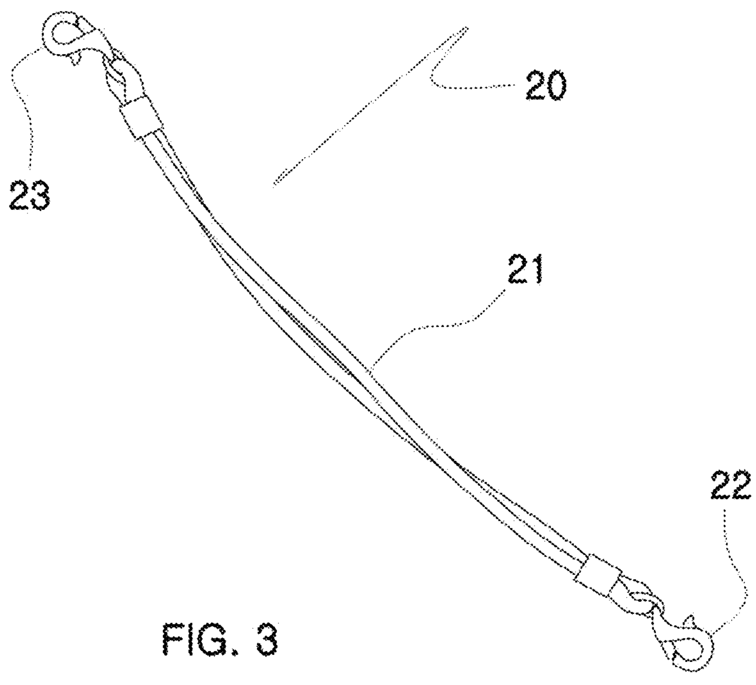
FIG. 3

FIG. 4
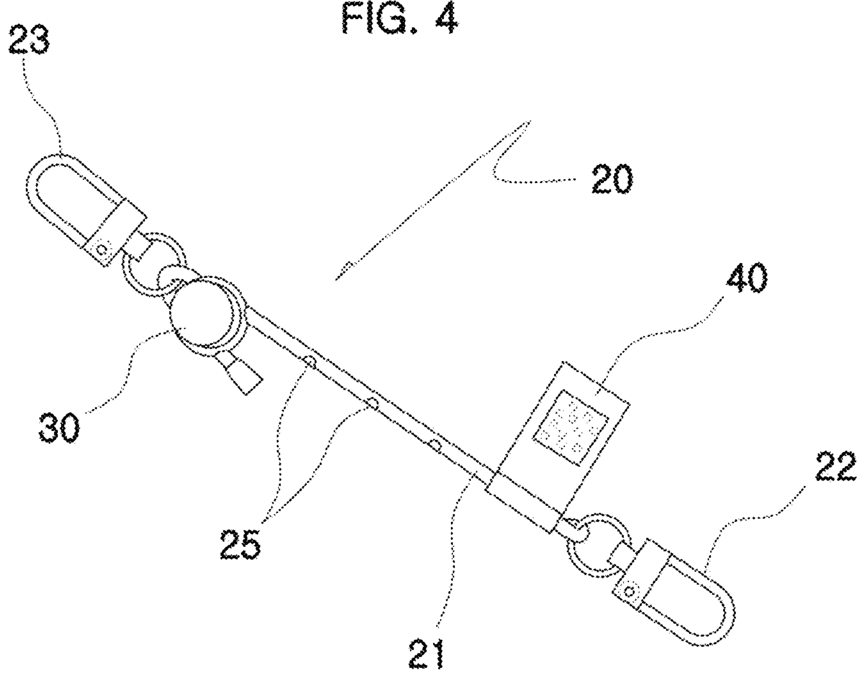
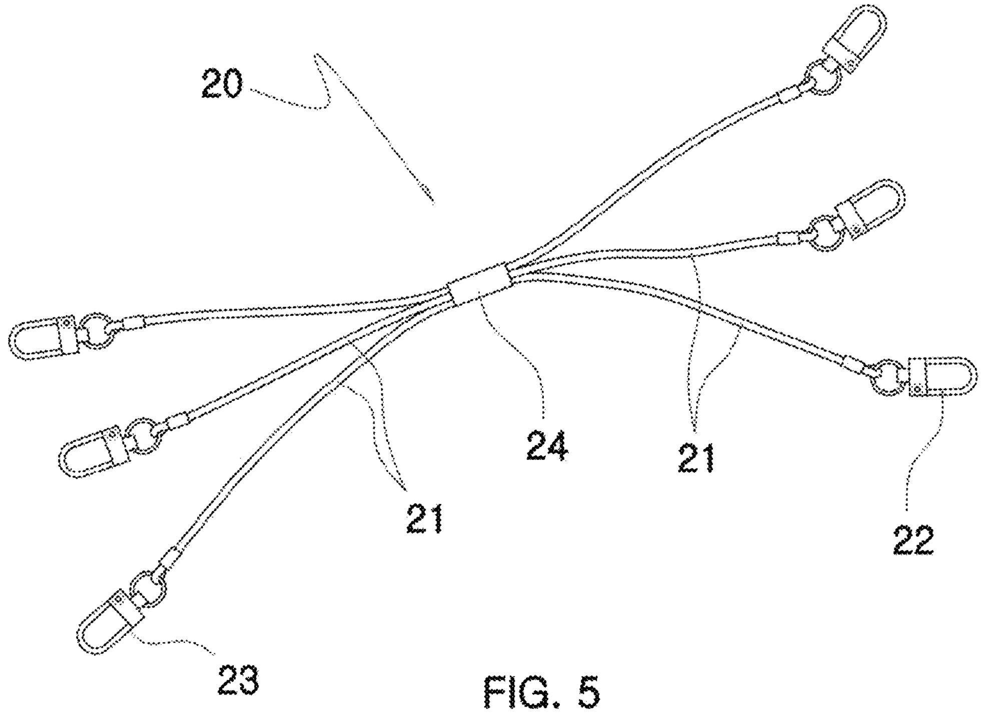
FIG. 5

FIG. 6
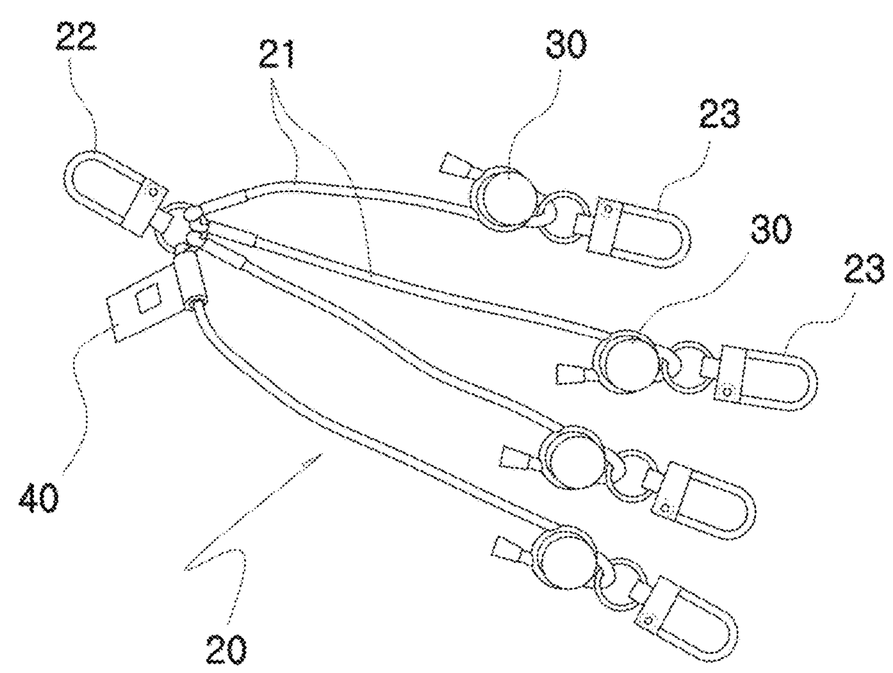
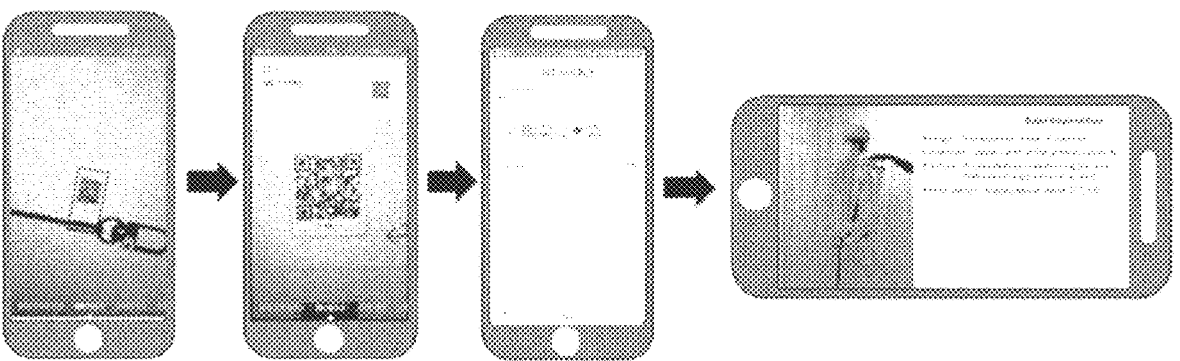
FIG. 7

TEACHING AID FOR LEARNING MUSCULOSKELETAL STRUCTURE OF HUMAN BODY

CROSS-REFERENCE TO RELATED APPLICATIONS

This application claims priority to International Patent Application No. PCT/KR2022/007970, filed on Jun. 7, 2022, and Korean Patent Application No. KR 10-2021-0082018, filed on Jun. 24, 2021, the contents of both of which are hereby incorporated by reference in their entirety.

TECHNICAL FIELD

The present disclosure relates to a teaching aid for learning the musculoskeletal structure of the human body and, more particularly, to a teaching aid for learning the musculoskeletal structure of the human body, which enables effective learning of the movement of the muscles and joints of the human body.

BACKGROUND

The human body has a tremendous number of muscles to support and maintain its frame and move its joints. Educational institutions such as medical schools, nursing schools, and allied health programs are required to teach students about attachment points, functions, and characteristics of the muscles.

Despite this necessity, there are limitations to getting a trainee to understand the shape, form, and direction of movement of the muscles inside the body through oral description or using images. For this reason, teaching aids and materials for visual learning are often utilized, such as human muscle and skeletal models, or training on cadavers is also performed.

However, such teaching aids and materials as human muscle and skeletal models that have been known up to the present do not fully reflect the structures for the movement of the muscles, which makes them inadequate to help comprehension. Moreover, since training on cadavers is performed through dissection of a donated body, trainees are given little opportunity to actively participate in cadaver-based training because of issues regarding the preservation of cadavers and legal restrictions on them.

In this regard, Korean Laid-Open Patent No. 2019-0078297 (Patent Document 1) suggested “Muscle tights for learning human muscles”, which allow LED bulbs to emit light from a muscle part selected by an app on a smartphone when learning about the muscles of the human body, the muscle tights including: tights made of spandex, that are formed of an upper garment and a lower garment representing human muscles and have an opening-closing member allowing the tights to be worn as a single unit on upper and lower parts of the human body; an LED line installed between knitted fabric of the tights and disposed along the shape and form of the muscles on the upper and lower bodies, for identifying the shape and form of the muscles and their contractions and relaxations by light emitted from LED bulbs; and a power supply part for selectively controlling the turn on/off of the LED bulbs by a switch.

However, such teaching aids and materials only make it possible to learn about large muscles exposed to surfaces, but not about small stable muscles near joints. Moreover, they cannot implement agonist muscles and antagonist muscles, including the direction of movement of joints through muscle contractions and relaxations, and are hard to identify muscle layers. In addition, they do not allow a trainee to practice with muscle models, like attaching or removing them themselves. For these reasons, these teaching aids and materials have limitations in clearly understanding the shape or form of the muscles and the direction and status of movement of them.

SUMMARY

The present disclosure is directed to solving the above-mentioned problems occurring in the conventional art and providing a teaching air for learning the musculoskeletal structure of the human body, which allows a trainee to install a muscle model formed of a stretchable elastic band on their own, at positions corresponding to attachment points (an origin point and an insertion point) of the muscle on a skeletal model of the human body so as to enable three-dimensional visual learning through the movement of joints or multi-joints while enabling learning about the origin point and the insertion point displayed on the skeletal model by identifying the shape, form, direction of movement, and condition of the muscle and its layers, and which therefore allows the trainee to find and learn about how the joints are linked to each other by implementing functional movements the human body makes in daily life.

An embodiment of the present disclosure provides a teaching air for learning the musculoskeletal structure of the human body including: a skeletal model having fixing rings provided at positions corresponding to an origin point and an insertion point of the muscle; and a muscle model having elasticity in the longitudinal direction and having both ends connected to the fixing rings at the positions of the origin point and insertion point, respectively.

The muscle model may be formed of a stretchable elastic band, and a fastening ring portion formed by bending an end of the elastic band may be formed at one end and the other end of the elastic band and connected to the fixing rings.

The muscle model may further include an elastic band having elasticity, a first fastening ring connected to one end of the elastic band, and a second fastening ring connected to the other end, the first fastening ring and the second fastening ring being connected to the fixing rings.

A stopper may be provided at a predetermined position on the elastic band to adjust the distance between the one end of the elastic band and the other end of thereof, whereby the musculoskeletal structure and contractions and relaxations of the muscle are implemented through the movement of the muscle model in response to the joint movement of the skeletal model.

According to the teaching aid for learning the musculoskeletal structure of the human body according to the present disclosure, trainees are visually intrigued by an origin point and an insertion point of the muscle indicated by rings on a skeletal model of the human body, and the trainees can do practices by manually fastening a muscle model formed of a stretchable elastic band onto the rings at the origin point and insertion point of the skeletal model, with a stopper mounted to an attachment point of the muscle. Therefore, this teaching aid can be utilized for education prior to clinical training on cadavers, which may improve the quality of training and make it possible to expect a quality improvement in actual clinical training and actual clinical therapies (such as muscle exercise and workout).

Moreover, contractions and relaxations of agonist muscles, antagonist muscles, and synergistic muscles can be implemented by adjusting the length of the muscle module formed of a stretchable elastic band, thereby enabling visual learning about three-dimensional functional movements. Furthermore, an identification code (e.g., QR code) for linking to video information is printed on a label (tag) where each muscle model is attached, which allows the trainee to learn audio-visually and therefore drastically enhances educational achievement.

BRIEF DESCRIPTION OF THE DRAWINGS

FIGS. 2 through 6 are views of a muscle model, in a teaching aid for learning the musculoskeletal structure of the human body according to an embodiment of the present disclosure.

FIG. 7 sequentially shows a process of linking to a video through a smartphone, in a teaching aid for learning the musculoskeletal structure of the human body according to an embodiment of the present disclosure.

LIST OF REFERENCE NUMERALS

Figure 1:
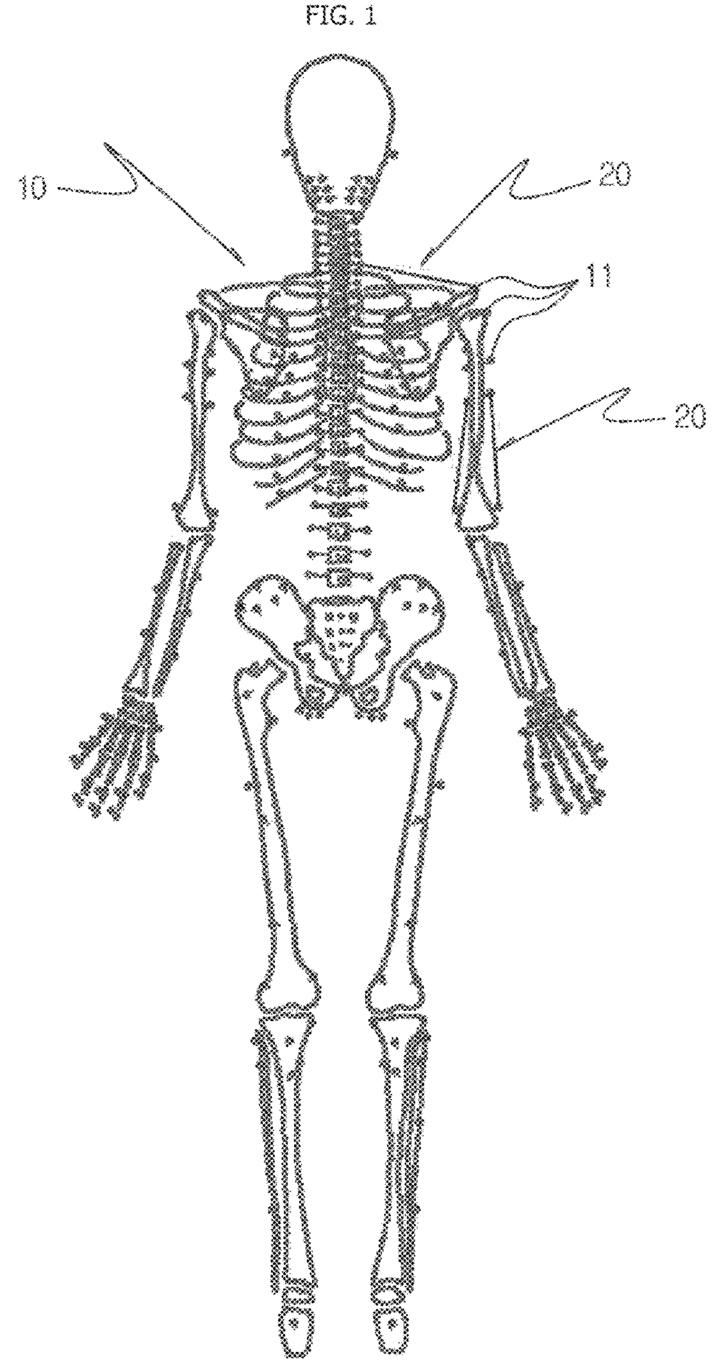
FIG. 1 is a front view schematically showing a teaching aid for learning the musculoskeletal structure of the human body according to an embodiment of the present disclosure.

10: Skeletal model
11: Fixing ring
20: Muscle model
21: Elastic band
21*a*: Fastening ring portion
22: First fastening ring
23: Second fastening ring
24: Connecting member
25: Spacing markings
30: Stopper
40: Tag
50: Ligament model
60: Linea alba model

DETAILED DESCRIPTION

To accomplish the foregoing aspects, a teaching aid for learning the musculoskeletal structure of the human body according to an embodiment of the present disclosure may include: a human body skeletal model having a plurality of fixing rings provided at the positions of an origin point and an insertion point of the muscle, respectively; and a muscle model having elasticity in the longitudinal direction and having both ends connected to the fixing rings at the positions of the origin point and insertion point, respectively. Therefore, the musculoskeletal structure can be implemented through the movement of the muscle model in response to the joint movement of the skeletal model.

In an exemplary embodiment, the muscle model may be formed of a stretchable elastic band, and a fastening ring portion formed by bending an end of the elastic band may be formed at one end and the other end of the elastic band and connected to the fixing rings.

In another exemplary embodiment, the muscle model may further include an elastic band having elasticity, a first fastening ring connected to one end of the elastic band, and a second fastening ring connected to the other end, the first fastening ring and the second fastening ring being connected to the fixing rings.

Here, a stopper may be provided at a predetermined position on the elastic band to adjust the distance between the one end of the elastic band and the other end thereof.

Furthermore, a plurality of spacing markings may be provided at equal intervals on the elastic band.

Furthermore, the elastic band may include two or more different types of elastic bands, and the elastic band may be placed in such a way as to have different elasticities for different positions on the skeletal model, corresponding to different muscle sizes.

Furthermore, the elastic band may come in two colors for a flexor muscle and an extensor muscle, and the skeletal model may be set up in such a way that the color of the elastic band differs for different positions corresponding to the flexor muscle and the extensor muscle.

Furthermore, a plurality of elastic bands may constitute a single muscle model, wherein a connecting member may be provided between one end and the other end of each elastic band to hold the plurality of elastic bands together.

Furthermore, a plurality of elastic bands may constitute a single muscle model, wherein one ends and the other ends of the elastic bands may be held together to form respective knots, and each of the knots at opposite ends may be connected to one fixing ring.

Furthermore, a plurality of elastic bands may constitute a single muscle model, wherein one ends of the elastic bands may be held together to form a knot, the knot being connected to one fixing ring, and the other ends of the plurality of elastic bands may be respectively connected to a plurality of fixing rings.

In this case, the first fastening ring may be connected to the knot, and the second fastening ring may be connected to the other end of each of the elastic bands.

Meanwhile, a tag may be provided on one side of the muscle model to provide a link to the human body's muscle information, whereby the muscle information can be obtained by scanning an identification code shown on the tag with a wireless communication terminal.

Furthermore, the fixing rings may be further provided on the end of a bone model and the end of a next other bone model at a joint part of the skeletal model, respectively, and a ligament model may be further provided whose opposite ends are respectively connected to the fixing rings at the two ends of each bone model, wherein the ligament model may be a non-elastic material.

The present disclosure may be changed in various manners and may have various embodiments. Hereinafter, exemplary embodiments of the present disclosure are illustrated and the present disclosure is described in detail based on the embodiments. However, this is not intended to limit the present disclosure to illustrated configurations, and the spirit and technical scope of the present disclosure include common changes, equivalents and/or substitutes of the illustrated forms.

Furthermore, in the entire specification, when it is described that one part is "connected" to the other part, the one part may be "directly connected" to the other part or may be "indirectly connected" to the other part with an element interposed therebetween. When it is said that an element is "included", the word "include" means that other element may be added not the exclusion of other element, unless explicitly described to the contrary.

Unless otherwise defined, all terms used herein have the same meaning as how they are generally understood by those of ordinary skill in the art to which the disclosure pertains. Any term that is defined in a general dictionary shall be construed to have the same meaning in the context of the relevant art, and, unless otherwise defined explicitly, shall not be interpreted to have an idealistic or excessively formalistic meaning.

FIG. 1 is a front view schematically showing a teaching aid for learning the musculoskeletal structure of the human body according to an embodiment of the present disclosure. FIGS. 2 through 6 are views of a muscle model, in a teaching aid for learning the musculoskeletal structure of the human body according to an embodiment of the present disclosure. FIG. 7 sequentially shows a process of linking to a video through a smartphone, in a teaching aid for learning the musculoskeletal structure of the human body according to an embodiment of the present disclosure.

Referring to FIG. 1, the teaching aid for learning the musculoskeletal structure of the human body according to an embodiment of the present disclosure largely includes a skeletal model 10 for implementing the human skeleton and a muscle model 20 provided to implement a human muscle.

The skeletal model 10 has fixing rings 11 provided at positions corresponding to actual attachment points of the muscle, i.e., an origin point and an insertion point.

The muscle model 20 has elasticity in the longitudinal direction to implement contractions and relaxations of the muscle and has both ends connected to the fixing rings 11 at the positions of the origin point and insertion point, respectively.

In this case, the musculoskeletal structure and contractions and relaxations of the muscle can be implemented through the movement (stretching and flexing) of the muscle model 20 in response to the joint movement of the skeletal model 10. For example, in the case of a muscle model 20 that embodies the supraspinatus on the bones of the shoulder and arm of the skeletal model 10, the movement of the supraspinatus may be predicted through the movement of the muscle model 20 when the arm is lifted or lowered.

As illustrated in FIGS. 2 through 6, the muscle model 20 may be manufactured in various structures, taking into account that there are various kinds of human muscles, such as parallel, convergent, fusiform, pennate, and aponeurosis muscles, depending on the shape or size of the muscle.

For example, as shown in FIG. 2, the muscle model 20 may be formed of an elastic band 21 having elasticity in response to a stretching or flexing of the muscle, a fastening ring portion 21*a* formed by bending an end of the elastic band may be formed at one end and the other end of the elastic band 21 so that the fastening ring portion 21*a* is connected to the fixing ring 11, and the elastic band 21 may be manufactured in varying sizes.

Moreover, as shown in FIG. 3, the muscle model 20 may further include an elastic band 21 having elasticity, a first fastening ring 22 connected to one end of the elastic band 21, and a second fastening ring 23 connected to the other end, wherein the first fastening ring 22 and the second fastening ring 23 may be connected to the fixing rings 11.

Furthermore, as well as being formed of a single elastic band 21, the muscle model 20 may be formed of a combination of a plurality of elastic bands 21. In this case, one ends and the other ends of the elastic bands 21 may be held together to form respective knot, the first fastening ring 22 and the second fastening ring 23 may be respectively connected to the knots at opposite ends, and each of the knots at opposite ends may be connected to one fixing ring 11, thereby forming a fusiform muscle model.

In addition, as shown in FIG. 4, a stopper 30 may be provided at a predetermined position on the elastic band 21 to adjust the distance between one end and the other end of the elastic band 21. That is, the stopper 30 may be configured to release, when necessary, the force by which two parts of the elastic band 21 are fastened, so as to decrease or increase the entire length of the elastic band 21 by pulling or releasing either part of the elastic band and then to fasten the two parts of the elastic band 21 back together. The stopper 30 is not limited to what is illustrated in the drawing, but it may have any structure as long as it is capable of decreasing or increasing the entire length of the elastic band 21 as desired.

By mounting the stopper 40 to the elastic band 21, the length of the elastic band 21 may be adjusted freely as required. Thus, the length of the elastic band 21 may be adjusted according to the actual length of the muscle or according to the distance between the fixing rings 11 in the skeletal model 10, and accordingly, the degree of contraction and relaxation of the muscle may be adjusted.

Furthermore, a plurality of spacing markings 25 may be provided at equal intervals of 1 cm, for example, on the elastic band 21. In this case, the muscle elasticity can be visually observed since the distance between the spacing markings 25 changes when the elastic band 21 lengthens or shortens.

More specifically, in order to learn that agonistic muscles and antagonistic muscles work together to contract and relax to allow skeletal movement, muscle models 20, for example, corresponding to biceps and triceps working to stretch or flex the elbow may be mounted to the skeletal model 10. In this case, when the elbow is flexed, the muscle model 20 corresponding to the biceps shortens and at the same time, the muscle model 20 corresponding to the triceps lengthens, whereas, when the elbow is stretched, the muscle model 20 corresponding to the biceps lengthens and, at the same time, the muscle model 20 corresponding to the triceps shortens. These lengthening and shortening phenomena can be visually observed through changes to the spacing markings 25.

Meanwhile, the elastic band 21 may be manufactured in two or more different types that differ in elasticity, by taking into account that the number of myofibrils differs for global muscles and local muscles. For example, a elastic band may be made by twisting multiple elastic yarns. The elastic band 21 may be made by twisting 9 or 12 elastic yarns to vary the thickness of the elastic band 21, or other methods may be used to vary the elasticity of the elastic band 21. Thus, electric bands 21 of different thicknesses may be placed in such a way as to have different elasticities for different positions on the skeletal model 10, corresponding to different sizes of muscles (global muscles and local muscles).

Moreover, the elastic band 21 may come in two colors for a flexor muscle and an extensor muscle since the muscles are classified into flexor muscles and extensor muscles, and, in the skeletal model 10, the elastic band 21 may have different colors for different positions corresponding to the flexor muscle and the extensor muscle. That is, an elastic band 21 for a muscle model 20 corresponding to the flexor muscle may be red, and an elastic band 21 for a muscle model 20 corresponding to the extensor muscle may be blue.

In addition, referring to FIGS. 4 and 7, a tag 40 may be provided on one side of the muscle model 20 to provide a link to the human body's muscle information. For example, the tag 40 may have an identification code such as a QR code printed on it, and the identification code may store information for linking to information on a particular muscle.

Accordingly, when the user (trainee) scans the identification code of the tag 40 attached to a muscle model 20 at a particular position, for example, a supraspinatus muscle model 20, with a wireless communication terminal such as a smartphone, information related to the supraspinatus muscle is displayed on the wireless communication terminal, thereby enabling in-depth learning about that muscle.

As shown in FIG. 5, the muscle model 20 may be formed of a combination of a plurality of elastic bands 21. In this case, a connecting member 24 may be provided between one end and the other end of each elastic band 21 to hold the plurality of elastic bands 21 together, thereby forming a parallel muscle model.

As shown in FIG. 6, the muscle model 20 may be formed of a combination of a plurality of elastic bands 21. In this case, one ends of the elastic bands 21 may be held together to form a knot, the knot being connected to one fixing ring 11, whereas, the other ends of the elastic bands 21 may be respectively connected to a plurality of fixing rings 11, thereby forming a convergent or pennate muscle model.

In this case, one first fastening ring 22 may be connected to the knot, and the second fastening ring 23 may be connected to the other end of each of the elastic bands.

Figure 8:
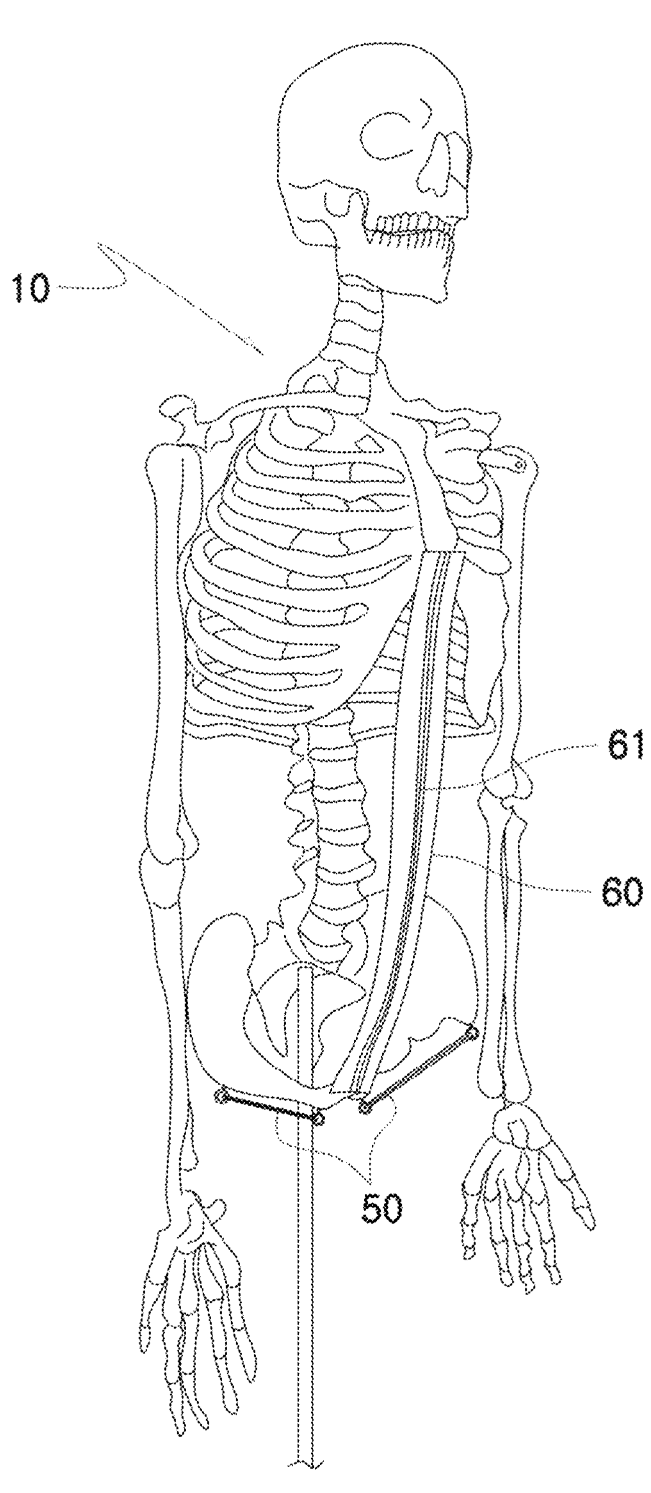
FIG. 8 is a photograph showing how a ligament model and a linea alba model are set up, in a teaching aid for learning the musculoskeletal structure of the human body according to an embodiment of the present disclosure.

FIG. 8 is a photograph showing how a ligament model and a linea alba model are set up, in a teaching aid for learning the musculoskeletal structure of the human body according to an embodiment of the present disclosure. Referring to FIG. 8, the skeletal model 10 may further include a ligament model 50 and a linea alba model 60. A ligament is the tissue that connects two bones to form a joint. Unlike muscles, ligaments do not contract and relax. The linear alba is a line formed by the union of aponeuroses along the midline of the anterior abdominal wall, which attaches to the xiphoid process superiorily, and to the pubic symphysis inferiorily, along the middle of the abdomen. Unlike muscles, the linea alba does not contract and relax.

Thus, the fixing rings 11 may be placed at one end and the other end of a bone model at a joint part of the skeletal model 10, respectively, and one end and the other end of a ligament model 50 formed of a non-elastic band may be connected to the fixing rings 11 at the ends of the bone model, thereby installing the ligament model 50 to the skeletal model 10.

Moreover, a linea alba model 60 may be further placed at the front of the skeletal model 10, which is a non-elastic band that vertically joins the xiphoid process and the pubic bone.

In this case, the linea alba model 60 may have a predetermined width and be divided into left and right halves being joined together in the middle with a zipper 61, whereby the left and right halves may be separated from each other or joined together through lowering or raising the zipper 61, thereby implementing diastasis rectus abdominis.

That is, diastasis rectus abdominis refers to a separation of the two sides of the rectus abdominis muscle which occurs when the linea alba becomes stretched during pregnancy. To implement this, the linea alba model 60 may be divided into two halves, and the zipper 61 may be centered between the two halves, so that two sides of the linea alba model 60 may be separated from each other or held together as necessary, thereby enabling visual learning about diastasis rectus abdominis.

Figure 9:
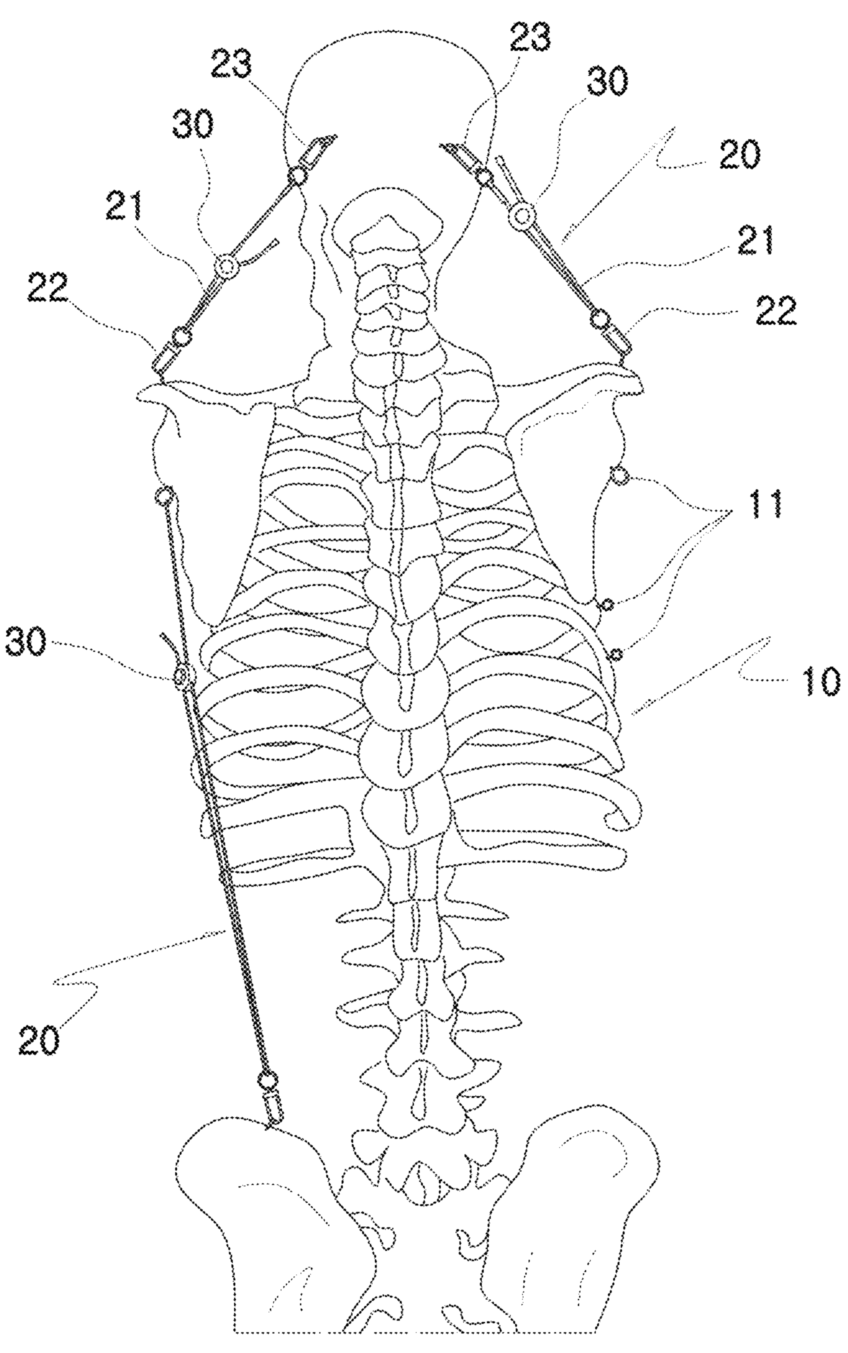
FIG. 9 is a photograph showing a usage status of a teaching aid for learning the musculoskeletal structure of the human body according to an embodiment of the present disclosure.

FIG. 9 is a photograph of an actual product which shows a usage status of a teaching aid for the musculoskeletal structure of the human body according to an embodiment of the present disclosure.

Referring to FIG. 9, a plurality of fixing rings 11 may be installed at positions corresponding to an origin point and an insertion point on a skeletal model 10 that embodies the skeleton of the human body, a muscle model 20 including an elastic band 21 may be connected to each fixing ring 11, and such a muscle model 20 may be a combination of elastic bands which may differ in length and number according to the shape of the muscle.

Moreover, the muscle model 20 allows for adjusting the length of the elastic band 21 by a stopper 30, and the muscle model 20 may come in two colors, red and blue, for different positions of a flexor muscle and an extensor muscle.

Therefore, the user (trainee) is able to install a muscle model 20 representing the actual shape of a muscle to a skeletal model 10 through a teaching aid for the musculoskeletal structure according to the present disclosure, and to visually observe the movement of the muscle model 20 by moving a joint part of the skeletal model 20, thereby enhancing the effect of learning about functional anatomy and utilizing the teaching aid as an alternative to training on cadavers.

As described above, the present disclosure has been described in connection with the limited embodiments showing the technical spirit of the present disclosure, but the present disclosure is not limited to the specific embodiments or shapes or numbers and may be modified and changed by a person having ordinary skill in the art to which the present disclosure pertains without departing from the gist of the present disclosure, such as changing or mixing some of the elements of the embodiments. Such modification and changes should not be individually understood from the technical spirit or prospect of the present disclosure.

The invention claimed is:

1. A teaching aid for learning a musculoskeletal structure of a human body, the teaching aid comprising:

a skeletal model including a plurality of fixing rings disposed at positions corresponding to an origin point and an insertion point of a muscle; and a muscle model having elasticity in a longitudinal direction and having two ends connected to the plurality of fixing rings at the positions of the origin point and the insertion point, respectively;

wherein the muscle model is formed of a stretchable first elastic band, and a fastening ring portion, which is formed by bending an end of the first elastic band, is formed at a first end and a second end of the first elastic band and connected to the plurality of fixing rings;

wherein the muscle model further includes a second elastic band having elasticity, a first fastening ring connected to a first end of the second elastic band, and a second fastening ring connected to a second end of the second elastic band, the first fastening ring and the second fastening ring being connected to the plurality of fixing rings; and wherein a stopper is arranged at a predetermined position on the second elastic band to adjust a distance between the first end of the second elastic band and the second end of the second elastic band, whereby the musculoskeletal structure and contractions and relaxations of the muscle are implemented through movement of the muscle model in response to joint movement of the skeletal model.

2. The teaching aid of claim 1, wherein a plurality of spacing markings are disposed at equal intervals on the second elastic band.

3. The teaching aid of claim 1, wherein the second elastic band includes at least two different types of elastic bands, and the second elastic band is arranged to have different elasticities for different positions on the skeletal model, corresponding to different muscle sizes.

4. The teaching aid of claim 1, wherein the second elastic band comes in two colors for a flexor muscle and an extensor muscle, and the skeletal model is configured such that a color of the second elastic band differs for different positions corresponding to the flexor muscle and the extensor muscle.

5. The teaching aid of claim 1, further comprising a tag arranged on one side of the muscle model to provide a link to a human body's muscle information, whereby the muscle information is obtainable via scanning an identification code disposed on the tag with a wireless communication terminal.

6. The teaching aid of claim 1, further comprising a ligament model, wherein:

the skeletal model further includes a plurality of second fixing rings arranged on a first end and a second end of a bone model at a joint part of the skeletal model, respectively;

opposite ends of the ligament model are respectively connected to the plurality of second fixing rings; and the ligament model is a non-elastic material.

7. The teaching aid of claim 1, further comprising a linea alba model, wherein:

the plurality of fixing rings are disposed on a xiphoid process model and a pubic symphysis model of the skeletal model;

opposite ends of the linea alba model are respectively connected to the plurality of fixing rings provided on the xiphoid process model and the pubic symphysis model; and the linea alba model is a non-elastic material.

8. The teaching aid of claim 7, wherein the linea alba model has a predetermined width and is divided into a left half and a right half that are joined together in a middle with a zipper, whereby the left half and the right half are separable from each other and joinable together via the zipper.

* * * * *